(12) United States Patent
Ali Ali et al.

(10) Patent No.: US 10,534,410 B2
(45) Date of Patent: Jan. 14, 2020

(54) ANGLED DEVICE BAY CARD ASSEMBLY

(71) Applicant: Lenovo (Singapore) Pte. Ltd., Singapore (SG)

(72) Inventors: Omar Ali Ali, Cary, NC (US); Rodrigo Samper, Wallace, NC (US); Marc Richard Pamley, Durham, NC (US); Alan Ladd Painter, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 15/940,400

(22) Filed: Mar. 29, 2018

(65) Prior Publication Data

US 2019/0302858 A1 Oct. 3, 2019

(51) Int. Cl.
*G06F 1/18* (2006.01)
*G06F 13/42* (2006.01)
*G06F 1/20* (2006.01)

(52) U.S. Cl.
CPC ............... *G06F 1/186* (2013.01); *G06F 1/20* (2013.01); *G06F 13/4221* (2013.01); *G06F 2213/0026* (2013.01)

(58) Field of Classification Search
CPC .......... G06F 1/1656; G06F 1/186; G06F 1/20; G06F 13/4221; G06F 1/16; G06F 1/18; G06F 1/181; H05K 5/00
See application file for complete search history.

(56) References Cited

U.S. PATENT DOCUMENTS

| 5,611,057 A * | 3/1997 | Pecone | G06F 1/184 |
| | | | 361/784 |
| 7,035,111 B1 * | 4/2006 | Lin | G06F 1/18 |
| | | | 361/748 |
| 9,594,716 B1 * | 3/2017 | Nair | G06F 13/4068 |
| 2009/0129002 A1 * | 5/2009 | Wu | G06F 1/186 |
| | | | 361/679.4 |
| 2015/0003004 A1 * | 1/2015 | Wu | G06F 1/185 |
| | | | 361/679.32 |
| 2016/0154762 A1 * | 6/2016 | He | G06F 13/4282 |
| | | | 710/301 |

* cited by examiner

*Primary Examiner* — Dimary S Lopez Cruz
*Assistant Examiner* — Ingrid D Wright
(74) *Attorney, Agent, or Firm* — Brian J. Pangrle (57) ABSTRACT

A card assembly includes a card that includes a first edge and an opposing second edge, where the first edge includes an edge connector; and device sockets mounted to the card and operatively coupled to the edge connector, where each of the device sockets defines an end of a respective device bay, where each of the device bays is disposed at an angle of approximately 25 degrees to approximately 75 degrees with respect to the edge connector.

20 Claims, 11 Drawing Sheets

ANGLED DEVICE BAY CARD ASSEMBLY

TECHNICAL FIELD

Subject matter disclosed herein generally relates to computing systems.

BACKGROUND

A computing system can include a processor mounted to a board such as, for example, a motherboard and, for example, connector mounted to a card that is received in another connector that is mounted to the board.

SUMMARY

A card assembly can include a card that includes a first edge and an opposing second edge, where the first edge includes an edge connector; and device sockets mounted to the card and operatively coupled to the edge connector, where each of the device sockets defines an end of a respective device bay, where each of the device bays is disposed at an angle of approximately 25 degrees to approximately 75 degrees with respect to the edge connector. Various other methods, apparatuses, systems, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing general principles of various implementations. The scope of invention should be ascertained with reference to issued claims.

Figure 1:
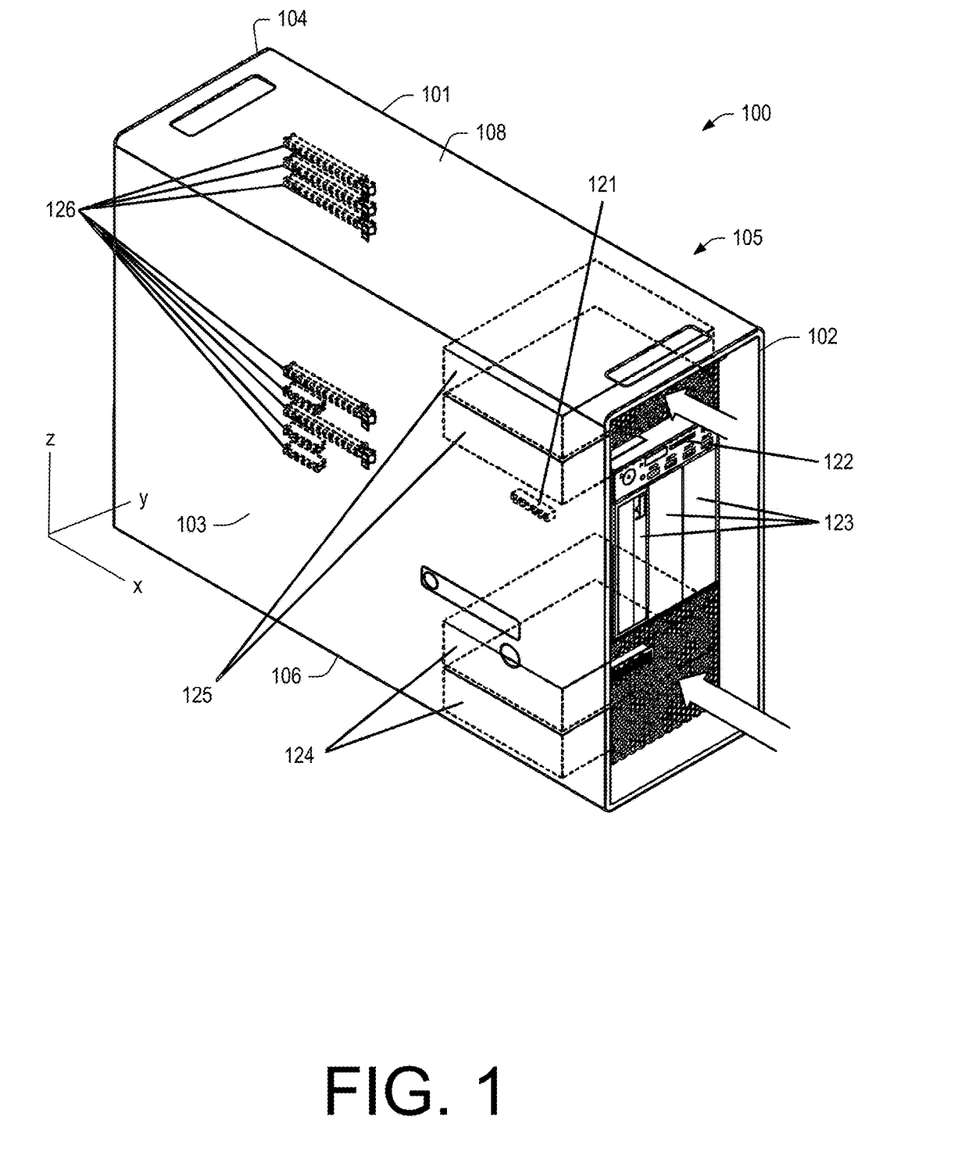
FIG. 1 is a diagram of an example of a computing system.

FIG. 1 shows an example of a computing system 100 that includes a case 101 with a front end 102, a back end 104, opposing sides 103 and 105 and opposing sides 106 and 108 where the ends and the sides may be described with respect to a three-dimensional coordinate system such as the Cartesian coordinate system (x, y, and z) shown in the example of FIG. 1.

In FIG. 1, some examples of device bay locations are shown, including solid-state drive slots 121, a card drive slot 122, flex bays 123 (e.g., 5.25 inch bays), storage drive bays 124, optional storage drive bays 125, and PCIe card slots 126.

FIG. 1 also shows a general direction of air flow via openings of the computing system 100 where air flow may be generally in a direction from the front end 102 to the back end 104. In such an example, air entering openings of the front end 102 can pass through the computing system 100 to transfer heat energy where the air can exit, for example, via openings in the back end 104 of the computing system 100. Such air flow may be driven by one or more air movers such as one or more fans with associated fan motors.

The computing system 100 can include a power supply, which may operatively couple to a power source (e.g., a grid, a battery, etc.). During operation, due to electrical inefficiencies, electrical power can be partially transformed into heat energy. Various components of the computing system 100 may be maintained within operational temperature ranges via, for example, heat transfer driven by one or more mechanisms (e.g., conduction, convection, radiation, etc.).

As an example, heat transfer may be affect by orientation of the computing system 100 with respect to gravity. For example, natural convection may be affected by orientation with respect to gravity. The computing system 100 may be oriented in various orientations where one of x, y and z may be aligned with gravity (e.g., up or down). An orientation that places the side 103 down and the side 105 up may cause components that are mounted to a board proximate and parallel to the side 105 to heat more than if the side 105 was down and the side 103 was up. In the computing system 100, positioning with the back end 104 down or the front end 102 down may block some openings for air flow. As an example, a computing system such as the computing system 100 may be provided with instructions as to orientations. For example, the orientation with the side 103 down may be contraindicated while orientations with one of the sides 105, 106 or 108 down may be feasible.

Figure 2:
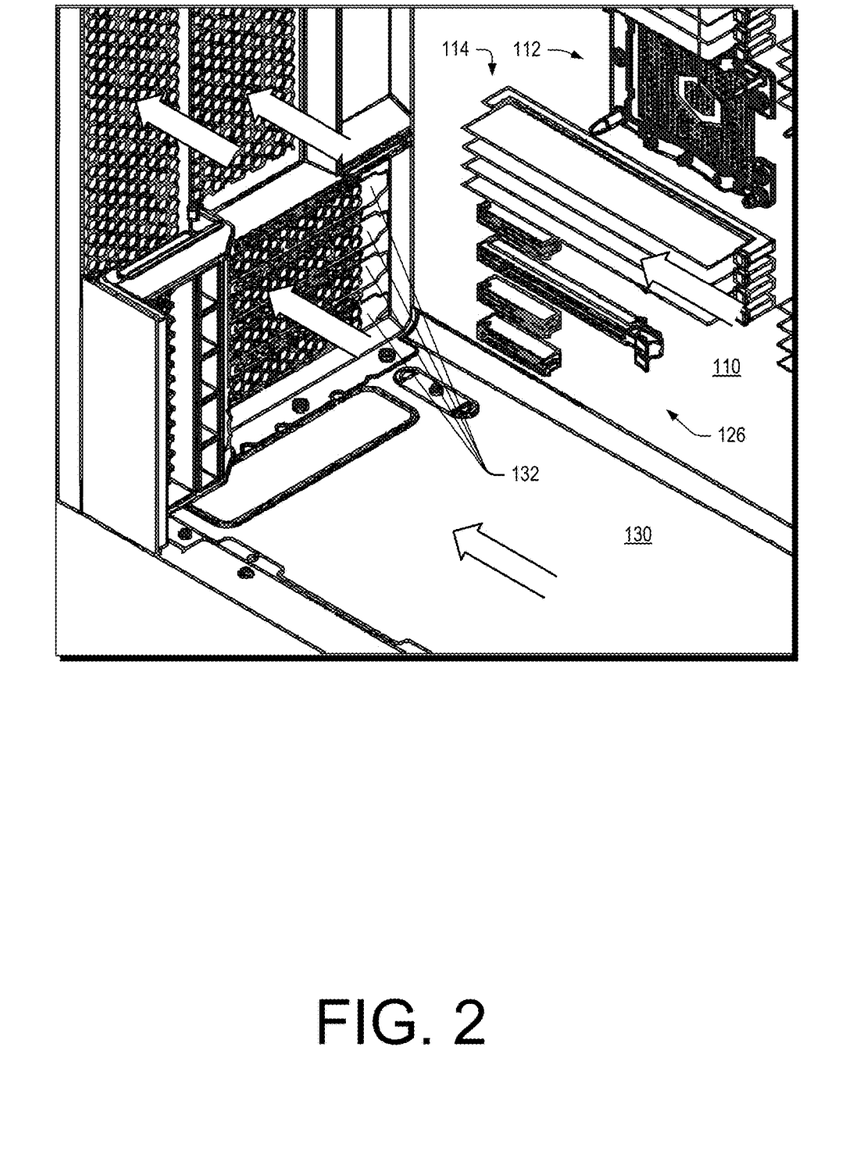
FIG. 2 is a diagram of a portion of the computing system of FIG. 1.

FIG. 2 shows a view of an internal chamber 130 of the computing system 100 where a board 110 includes fixtures for a processor or processors 112 and fixtures for memory 114 (e.g., RAM, etc.). As shown, the board 110 can include a plurality of card slots 126 where each of the card slots 126 may receive a respective card.

In the example of FIG. 2, the various features can include electrical connections. For example, such electrical connections can operatively couple features (e.g., a processor to memory, memory to storage, storage to an interface, etc.).

In the example of FIG. 2, various brackets 132 are shown at the back end 104 of the computing system 100 where the brackets 132 include openings that can allow for flow of air. As mentioned, air can flow in the internal chamber 130 to transfer heat energy between one or more components of the computing system 100 and the air.

Figure 3:
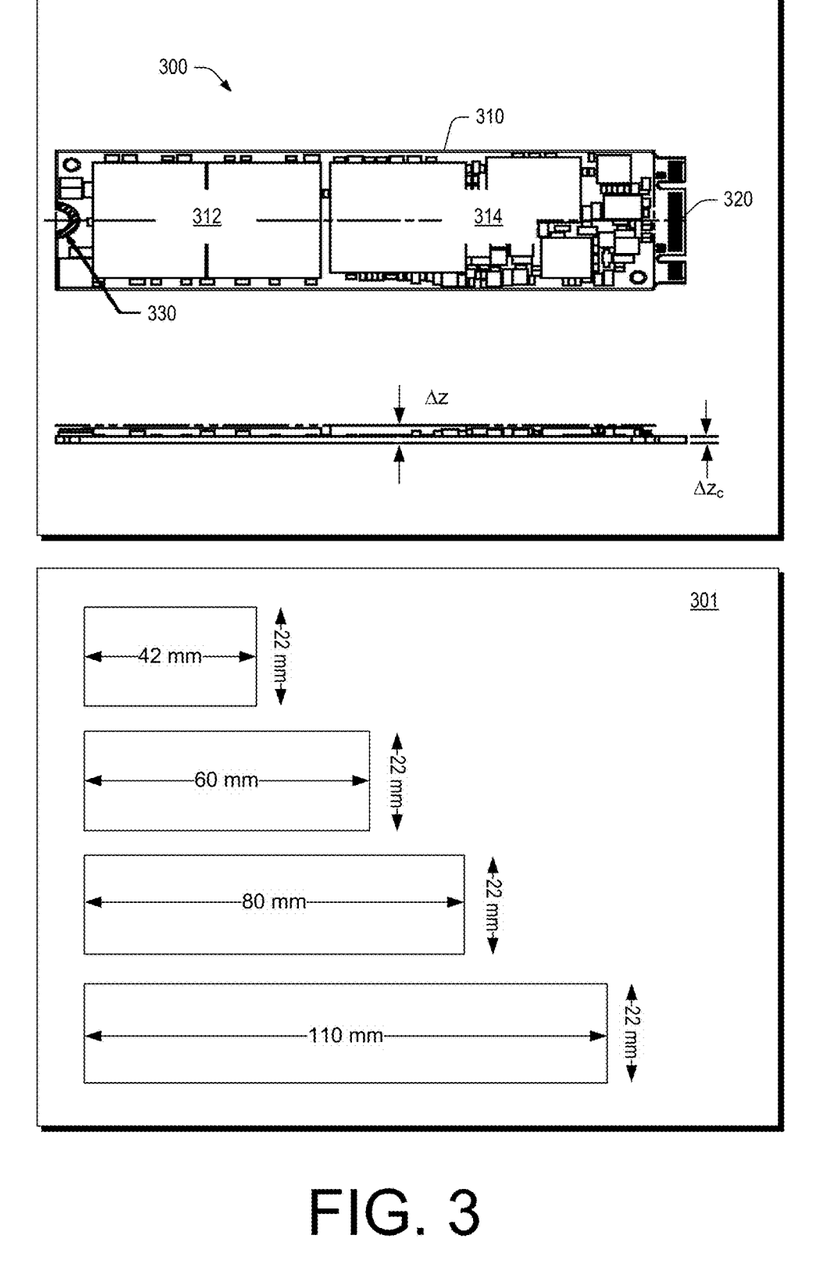
FIG. 3 is a diagram of an example of a device.

FIG. 3 shows an example of a storage device 300 that includes a card 310, storage component(s) 312, circuitry 314, an edge connector 320 and a mount socket 330. The device 300 may be defined by various dimensions, some of which are shown in FIG. 3. For example, in a diagram 301, length and width dimensions are illustrated, including 22 mm×42 mm, 22 mm×60 mm, 22 mm×80 mm and 22 mm×110 mm. As an example, where area (e.g., length) is increased more of the storage components 312 can be mounted to the card 310. As such, the storage capacity of the device 300 may be increased.

The device 300 may conform to the M.2 form factor specification, formerly known as the Next Generation Form Factor (NGFF) specification for internally mounted computer expansion cards and associated connectors. Computer bus interfaces provided through the M.2 connector include PCI Express 3.0 (e.g., up to four lanes), Serial ATA 3.0, and USB 3.0. The M.2 connector has various keying notches that denote various purposes and capabilities of M.2 hosts and modules, which can help to avoid plugging of a M.2 module into a feature-incompatible host connector.

The M.2 specification includes support for the Advanced Host Controller Interface (AHCI) at the logical interface level, and also supports NVM Express (NVMe) as a logical device interface for M.2 PCI Express SSDs. Support for AHCI can provide software-level backward compatibility with legacy SATA devices and legacy operating systems. Support for NVM Express can allow for utilization of the capability of high-speed PCI Express storage devices to perform many I/O operations in parallel.

M.2 modules may optionally integrate multiple functions, including, for example, one or more of the following device classes: WI-FI, BLUETOOTH, satellite navigation, near field communication (NFC), digital radio, Wireless Gigabit Alliance (WiGig), wireless WAN (WWAN), and solid-state drives (SSDs).

NVMe can allow for exploitation of parallelism in host hardware and software, for example, via data transfers with fewer stages, greater depth of command queues, and more efficient interrupt processing.

The M.2 specification can allow for relatively long modules and, for example, double-sided component population. As an example, M.2 SSD devices can provide larger storage capacities and can also double the storage capacity within the footprints of mSATA devices.

An M.2 specification device can be rectangular, with an edge connector on one edge (e.g., 75 positions with up to 67 pins, 0.5 mm pitch, pins overlap on different sides of the PCB) and a semicircular mounting hole at an opposite edge. Each pin on a connector may be rated for up to 50 V and 0.5 A. The M.2 specification includes device widths of 12, 16, 22 and 30 mm, and lengths of 16, 26, 30, 38, 42, 60, 80 and 110 mm.

Commercially available M.2 expansion cards tend to be 22 mm wide, with varying lengths of 30, 42, 60, 80 and 110 mm. As to codes, these include both the width and length of a particular device; for example, 2242 as a code means that the device is 22 mm wide and 42 mm long, while 2280 denotes a device 22 mm wide and 80 mm long (e.g., as to its card portion).

An M.2 device may be installed into a mating connector provided by a host's circuit board where a single mounting screw can secure the device into place. As an example, components may be mounted on either side of a device. As an example, the M.2 specification may be adhered to for thickness (e.g., allowable thickness of components as 1.5 mm per side). Different host-side connectors can be used for single- and double-sided M.2 devices.

As an example, a board may accept multiple lengths of M.2 devices. For example, sockets capable of accepting longer M.2 devices may also accept shorter ones by providing different positions for a mounting screw (e.g., or mounting peg, etc.).

As an example, the device 300 may include memory for storage of information and be rated with a capacity. For example, a capacity may be of the order of MB or of the order of 1 TB or more.

Figure 4:
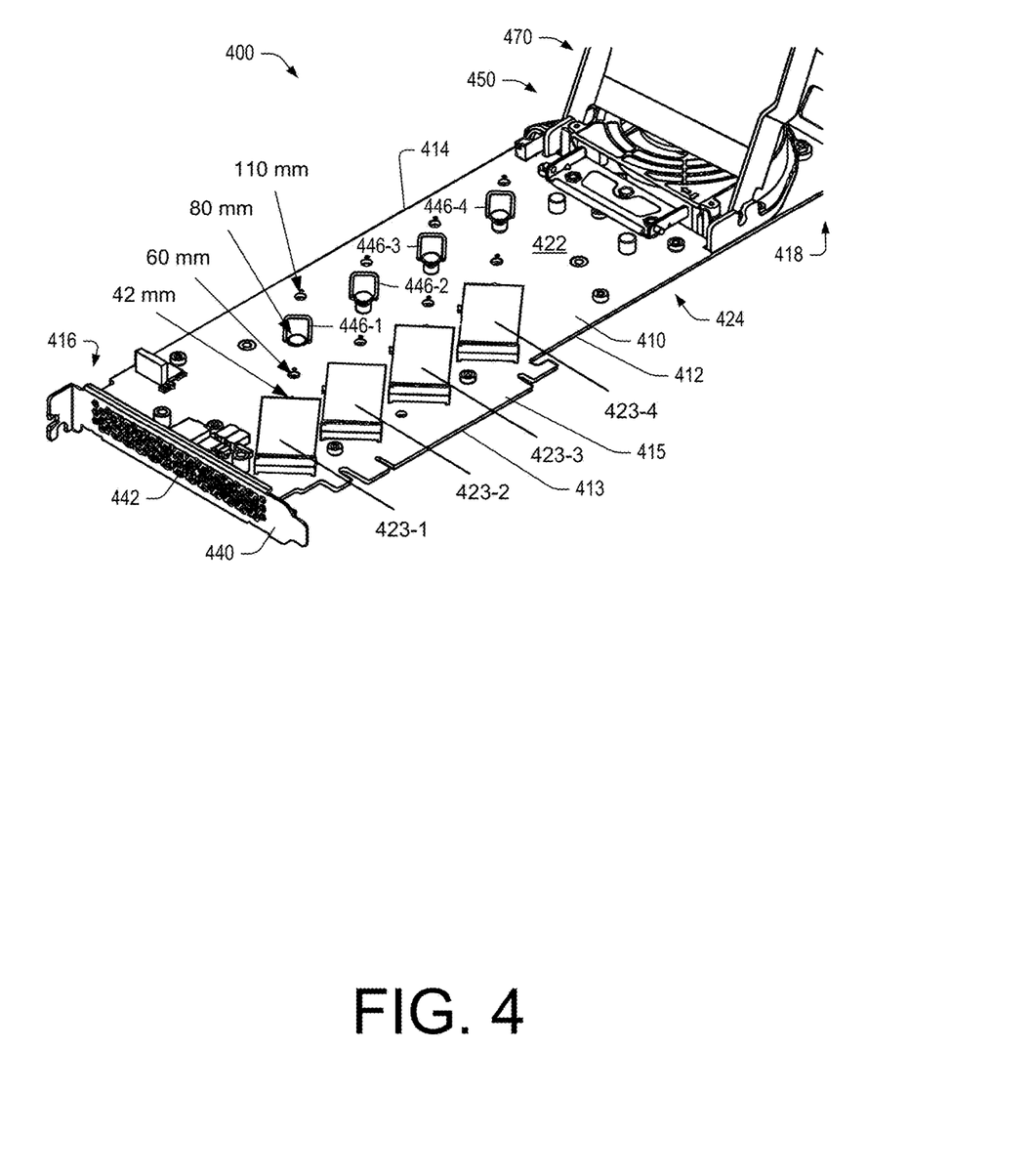
FIG. 4 is a diagram of an example of a card assembly.

FIG. 4 shows an example of a card assembly 400 that includes a card 410 with an edge 412 that extends to edge connector edge 413, an opposing edge 414, an edge connector 415, and opposing ends 416 and 418. As an example, the end 418 may be a front end and the end 416 may be a back end where the card assembly 400 is received in one of the card slots 126 of the computing system 100 of FIGS. 1 and 2.

As an example, the edge connector 415 can be a PCI (Peripheral Component Interconnect) Express (PCIe) edge connector. The specifications for PCIe are maintained by the PCI-SIG (PCI Special Interest Group).

In the example of FIG. 4, a length of the card 410 can be defined by the opposing ends 416 and 418 and a width (or height depending on convention) of the card 410 may be defined between the edge connector edge 413 and the edge 414 or, for example, between the edges 412 and 414. As an example, a distance between the edge connector edge 413 and the edge 414 may be, according to a PCIe specification, approximately 110 mm (e.g., approximately 4.4 inches). In such an example, when the edge connector 415 is received in a slot such as one of the card slots 126, the exposed width (or height) is less than 110 mm, for example, consider the distance between the edge 412 (a portion not along the edge connector edge 413) and the edge 414.

As shown in the example of FIG. 4, the card assembly 400 can include a bracket 440 with openings 442, a fan 450 and a cover 470. In such an example, the card 410 can include a side 422 and an opposing side 424 where a space may be defined between the side 422 and the cover 470 where the fan 450 can be utilized to move air in the space.

As shown in the example of FIG. 4, the card assembly 400 includes device bays 423-1, 423-2, 423-3 and 423-4 that can receive one or more devices such as the storage device 300 of FIG. 3 (e.g., or other type of device, which may include features according to the M.2 specification, etc.).

Figure 5:
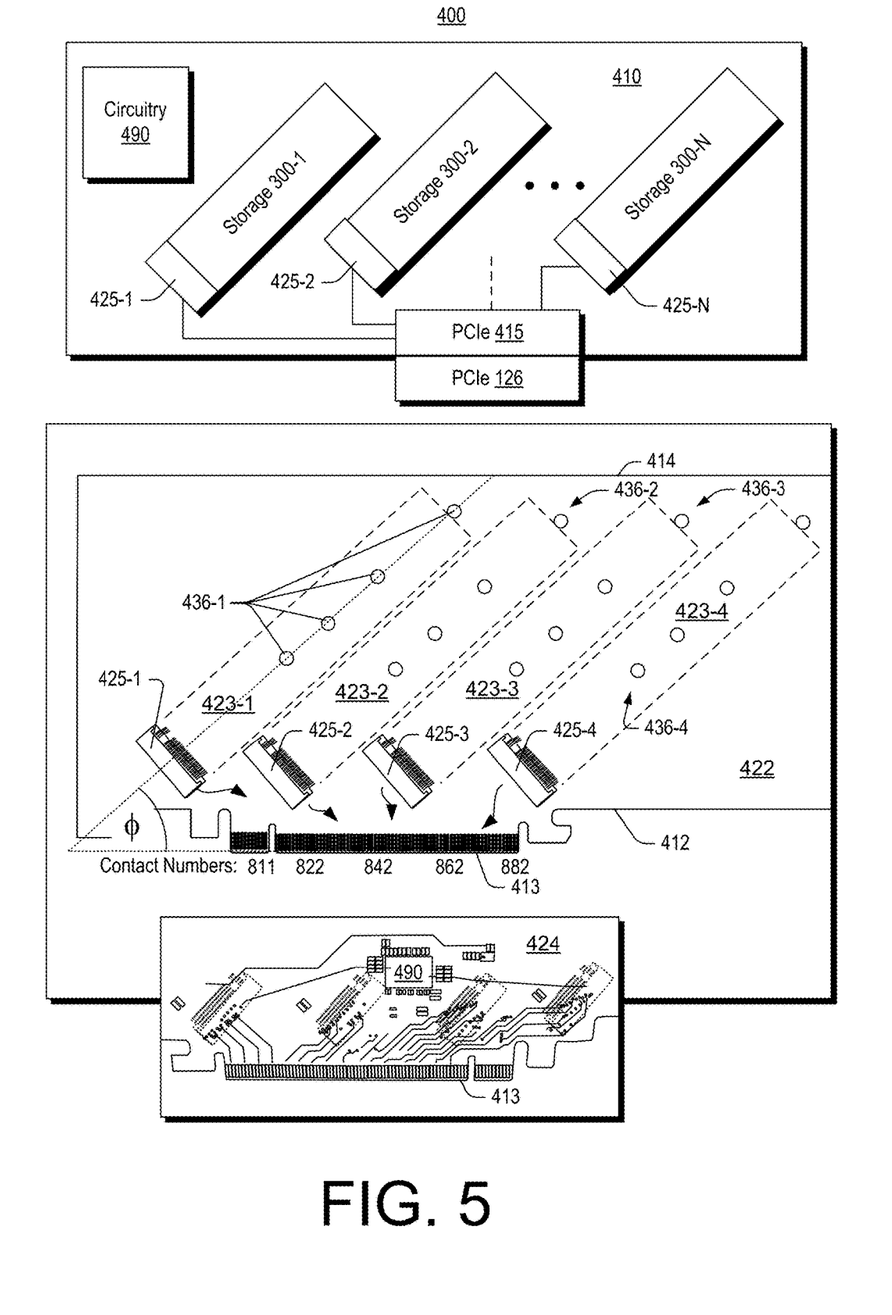
FIG. 5 is a series of diagrams of examples of card assemblies.

In the example of FIG. 4, the card 410 includes series of openings, labelled as 436-1, 436-2, 436-3 and 436-4 in the example of FIG. 5. In the example of FIG. 4, the openings can be associated with device lengths such as, for example, 42 mm, 60 mm, 80 mm and 110 mm. In the example of FIG. 4, the distance between the edge 412 and the edge 414 and/or the edge connector edge 413 and the edge 414 may be discerned with respect to the examples of lengths illustrated. In the example of FIG. 4, mounting component 446-1, 446-2, 446-3 and 446-4 are shown as each being received by a respective opening, for example, 80 mm length openings; noting that a mixture of lengths of devices may be received by the card assembly 400.

In the example of FIG. 4, where a device is received by a corresponding device bay, the device can be in a space that is between the cover 470 and the side 422 of the card 410. In such an example, the fan 450 can move air through the space to transfer heat energy to or away from the device (e.g., depending on temperature differential between the air and the device). In such an example, air may be moved from the fan 450 across the device and through at least some of the openings of 442 of the bracket 440 when the card assembly 400 and device are installed in the internal chamber 130 of the computing system 100.

FIG. 5 shows a block diagram of an example of the card assembly 400 as including the card 410, an interface 415, sockets 425-1, 425-2, . . . , 425-N that are operatively coupled to the interface 415, and circuitry 490. As shown, the interface 415 may be a PCIe interface and the interface 415 may connect via one of the slots 126 as illustrated in FIG. 1.

As to the circuitry 490, it can include clock driver circuitry such as, for example, a clock driver integrated circuit (e.g., consider the PERICOM PI6C20400 integrated circuit).

As an example, the card assembly 400 may be without a redriver. For example, the card assembly 400 may not include a PCIe redriver. Such a redriver would occupy space and be at an added cost (e.g., several USD or more) and consume power (e.g., approximately 0.5 W, etc.).

As an example, the card assembly 400 may be without a retimer. As an example, a redriver or a retimer may be referred to as types of repeaters. A repeater may aim to improve a signal path down traces or cables. Retimers can be fairly complex devices that use clock/data recovery (CDR) and phased-lock-loop (PLL) circuitry to retime and "reset" a clock and data signals and send them down a signal path. Redrivers tend to be less complex devices that use a linear or limiting amplifier to "reproduce" an amplified input signal on its output and send it down a signal path. A repeater may aim to address signal loss, which may occur where a device is located a greater distance from an interface.

In the example of FIG. 5, the distances between the sockets 425-1, 425-2, . . . , 425-N with respect to the interface 415 can be acceptable without implementation of a repeater (e.g., a redriver and/or a retimer). As an example, one or more of the sockets 425-1, 425-2, . . . , 425-N may be at an opposite end, for example, closer to the edge 414 of the card 410. In such an example, a card assembly may include one or more repeaters (e.g., as distance is increased from a socket to the interface 415).

In FIG. 5, contact numbers are shown as examples as to "pads" that provide for electrical contact along a portion of the edge 412 that can be received at least in part in a slot. As to width of the card 410, it may be measured from the lead line of the reference numeral 412 to the lead line of the reference numeral 414.

In the example of FIG. 5, the width of the card 410 is less than approximately 110 mm or a distance from the socket 425-1 to a further opening in the series of opening 436-1. As an example, a card may include a single opening in one or more series of openings, which can be, for example, at a position of the further opening 436-1. For example, the card 410 may be configured to accept long devices only (e.g., 110 mm devices). However, as shown, the card 410 may be configured to accept different length devices or, for example, a number of devices of the same length, where the card 410 can accommodate different lengths.

In the example of FIG. 5, an angle is shown as φ, which is an angle formed by a central axis of a device bay and the edge 412, for example, at the portion that includes the electrical contacts.

As an example, the angle φ may be an angle in a range from approximately 25 degrees to approximately 75 degrees. As an example, where the bays 423-1, 423-2, 423-3 and 423-4 are to accommodate one or more devices with a specified length of 110 mm, the angle may be in a range, for example, from approximately 30 degrees and approximately 60 degrees or, for example, from approximately 35 degrees and approximately 55 degrees. In the example of FIG. 5, the angle is approximately 42 degrees.

As an example, a PCIe card assembly can include device bays that allow for placing a plurality of M.2 specification devices next to each other and proximate to a PCIe edge connector where the device bays can be defined by an angle and disposed at the angle where the angle is selected from a range from approximately 35 degrees and 55 degrees (see the angle φ in FIG. 5). In such an example, the PCIe card assembly can include bays for multiple 110 mm devices. In such an example, the PCIe card assembly may operate one or more of the devices without a repeater (e.g., without a redriver and without a retimer). As an example, a card assembly may include a repeater, however, one or more device bays for storage devices may operate a storage device without use of the repeater.

The example illustrated in FIG. 5 can place M.2 specification connectors (e.g., sockets) in a side-by-side, spaced-apart arrangement closer to the PCIe edge than an opposing edge. For example, if the PCIe edge is received by a slot, then the connectors (e.g., sockets) are close to (e.g., adjacent to) the slot. As an example, a device bay may be defined with a socket away from an edge connector or a socket near an edge connector. In the example of FIG. 5, the device bays are with their sockets near the edge connector (e.g., closer to the edge 412 than to the edge 414 of the card 410).

Where device bay sockets are near the edge connector, compared to away, the trace lengths for PCIe differential pairs between the PCIe edge connector and the sockets (e.g., M.2 connectors) is reduced (e.g., minimized, etc.). In such an example, a card assembly may operate with one or more devices in the one or more device bays (e.g., plugged into respective one or more sockets) without circuitry that functions to recondition high speed signals as may be associated with transfers for information (e.g., data) stored in a respective one of the one or more devices. Such an arrangement and operation may be achieved at least in part by having shorter traces, as a consequence of utilizing the near configuration with an angle in a specified range (see, e.g., foregoing examples of ranges). As an example, the card assembly 400 may be referred to as a carrier card as it can carry one or more devices, which can be storage devices.

FIG. 5 shows an approximate view of the side 424 of the card 410 where various traces can be seen where at least some of the traces are electrically coupled to the edge connector 413. The sockets 425-1, 425-2, 425-3 and 425-4 are shown in dotted lines as they are mounted on the side 422 of the card 410. Also shown in FIG. 5, is an integrated circuit (e.g., a chip) or circuitry 490. As shown in the example of FIG. 5, the sockets 425-1, 425-2, 425-3 and 425-4 are closer to the edge connector 413 than to the opposite edge 414. In such an arrangement, the card assembly 400 may be without repeaters and, for example, portions of devices can be along paths of air flow, as may be driven by a fan. As the sockets 425-1, 425-2, 425-3 and 425-4 tend to be "solid", they do not provide for air flow through them, rather, air flows around them (e.g., they are obstacles to air flow). If one or more of the sockets 425-1, 425-2, 425-3 and 425-4 were mounted closer to the edge 414, the one or more may present as one or more obstacles to air flow as well as, for example, lengthen traces to the edge connector 413 to an extent that a repeater or repeaters are to be included to assure signal timing and/or quality.

A connection between a PCIe device and other components of a system can be referred to as a link. A link may be specified, for example, via a bi-directional, serial (1-bit), point-to-point connection known as a lane. As an example, a link can use more than one lane at a time. As an example, an edge connector may be specified by lane, such as ×1 link, ×4 link, ×8 link, ×16 link, etc. As an example, a card can be a PCIe device that can include a ×16 link edge that can be received by an edge connector (e.g., a ×16 link edge connector).

Various types of PCIe cards may physically fit into a respective type of edge connector with a corresponding lane configuration or higher (e.g., up-plugging). For example, a ×1 card may fit into ×1, ×4, ×8, and ×16 edge connectors. As an example, a link may be operatively coupled to a hub of a computing system that may perform, for example, network-like switching.

TABLE 1

PCI Express Card Pins and Length

| Lanes | Pins | | Length | |
|---|---|---|---|---|
| | Total | Variable | Total | Variable |
| ×1 | 2 × 18 = 36 | 2 × 7 = 14 | 25 mm | 7.65 mm |
| ×4 | 2 × 32 = 64 | 2 × 21 = 42 | 39 mm | 21.65 mm |
| ×8 | 2 × 49 = 98 | 2 × 38 = 76 | 56 mm | 38.65 mm |
| ×16 | 2 × 82 = 164 | 2 × 71 = 142 | 89 mm | 71.65 mm |

As an example, pads of an edge connector may be spaced at approximately 1 mm intervals, and the thickness of an edge of a card to be received by a connector can be approximately 1.8 mm.

As an example, a card may be about 24 cm in length (e.g., about 9.5 inches) and about 11 cm in width (or height depending on convention) (e.g., about 4.4 inches). As an example, a card may be less than 24 cm in length and be about 11 cm in width (or height). As an example, a card may be, in a plan view, substantially rectangular where an edge connector extends from a side of the rectangle.

Figure 6:
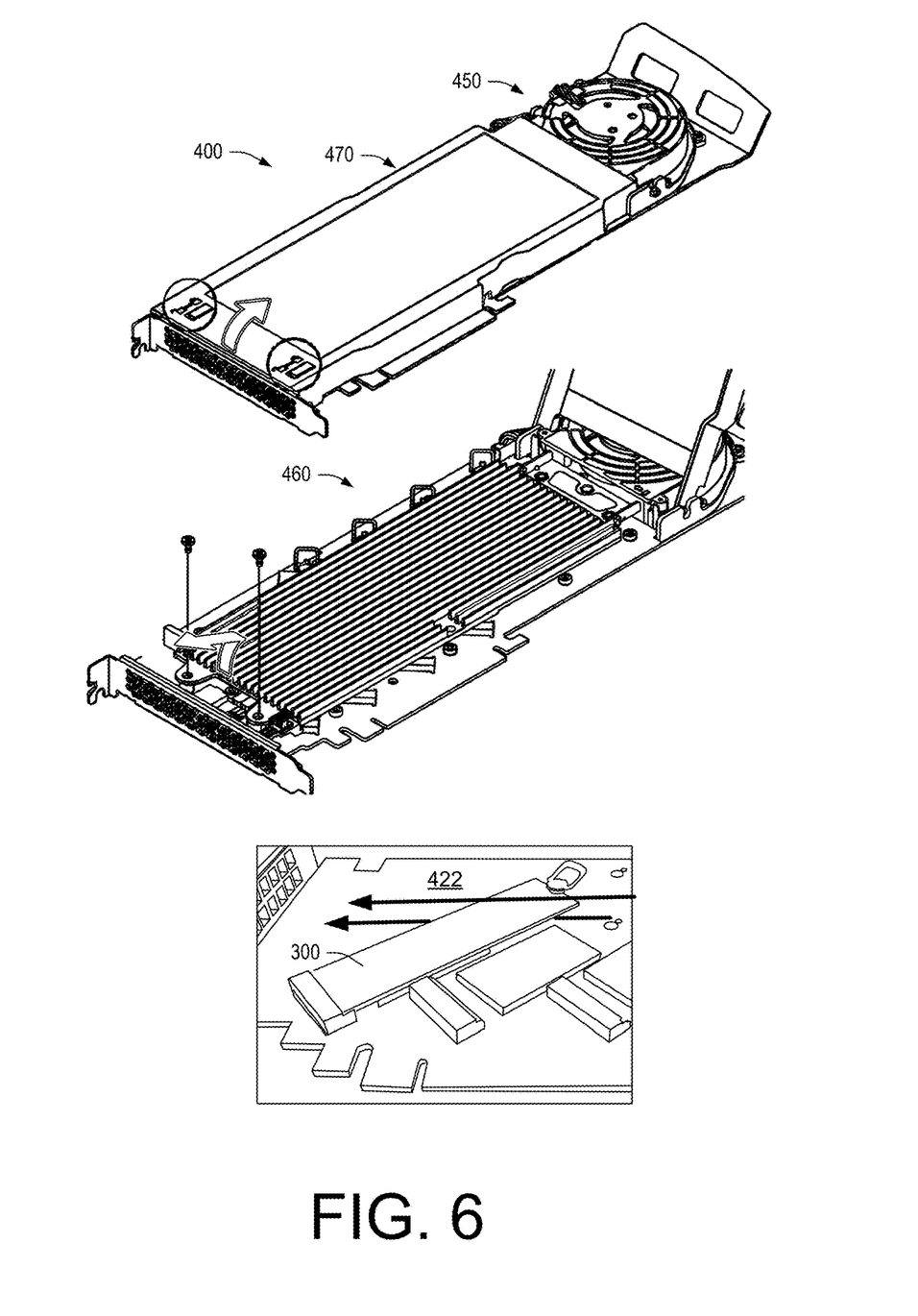
FIG. 6 is a series of diagrams of examples of a card assembly.

FIG. 6 shows an example of the card assembly 400 with the cover 470 and with heat transfer equipment 460, which may include fins and/or other features that aim to increase heat transfer surface area. As shown in FIG. 6, where device bays are angled and at least one device bay includes a device, the device can be similarly angled when received in a socket of a respective one of the device bays. The device 300 as illustrated in FIG. 6 may be at least in part in contact with a heat transfer material that is in contact with the card 410 (e.g., the side 422 of the card 410) and the device 300 may be spaced a distance from the card 410 such that a clearance (e.g., a gap) exists between the device 300 and the card 410. As illustrated in FIG. 6, air may flow in the clearance, for example, as driven by the fan 450. In such an example, air may pass opposing sides of the device 300 to enhance heat transfer.

In the example of FIG. 6, heat transfer can occur via one or more heat transfer mechanisms (e.g., convection, conduction, radiation, etc.). As mentioned, a heat transfer material may be utilized that can conduct heat energy while a fan and/or natural convection may be utilized to transfer heat energy via convection.

FIGS. 7, 8, 9 and 10 illustrate an example of a method with respect to equipment that includes a card assembly and one or more devices that can be received in respective one or more device bays of the card assembly.

Figure 7:
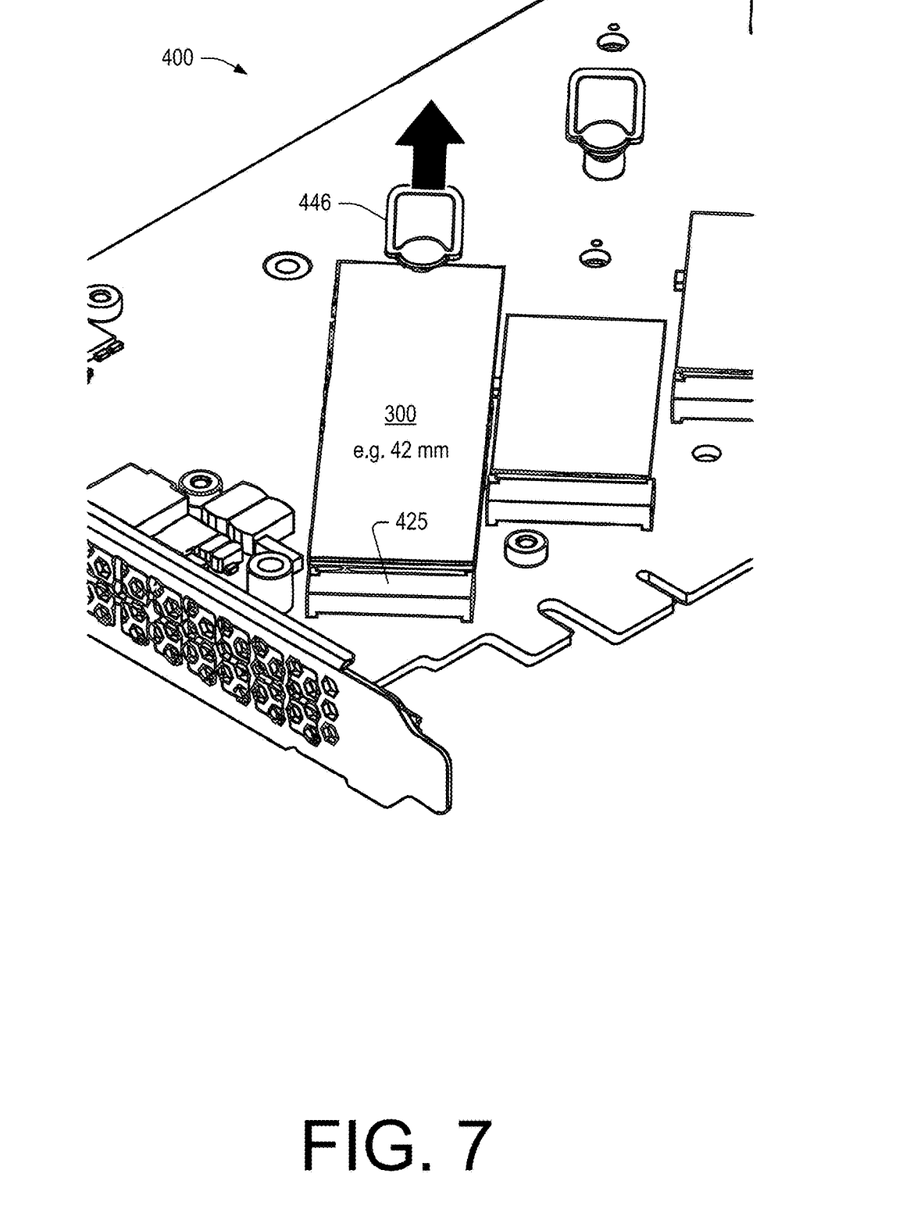
FIG. 7 is a diagram of an example of a method with respect to a card assembly.

FIG. 7 shows an arrow that indicates a direction of movement for the mounting component 446, for example, as part of a removal process for the device 300 from the socket 425.

Figure 8:
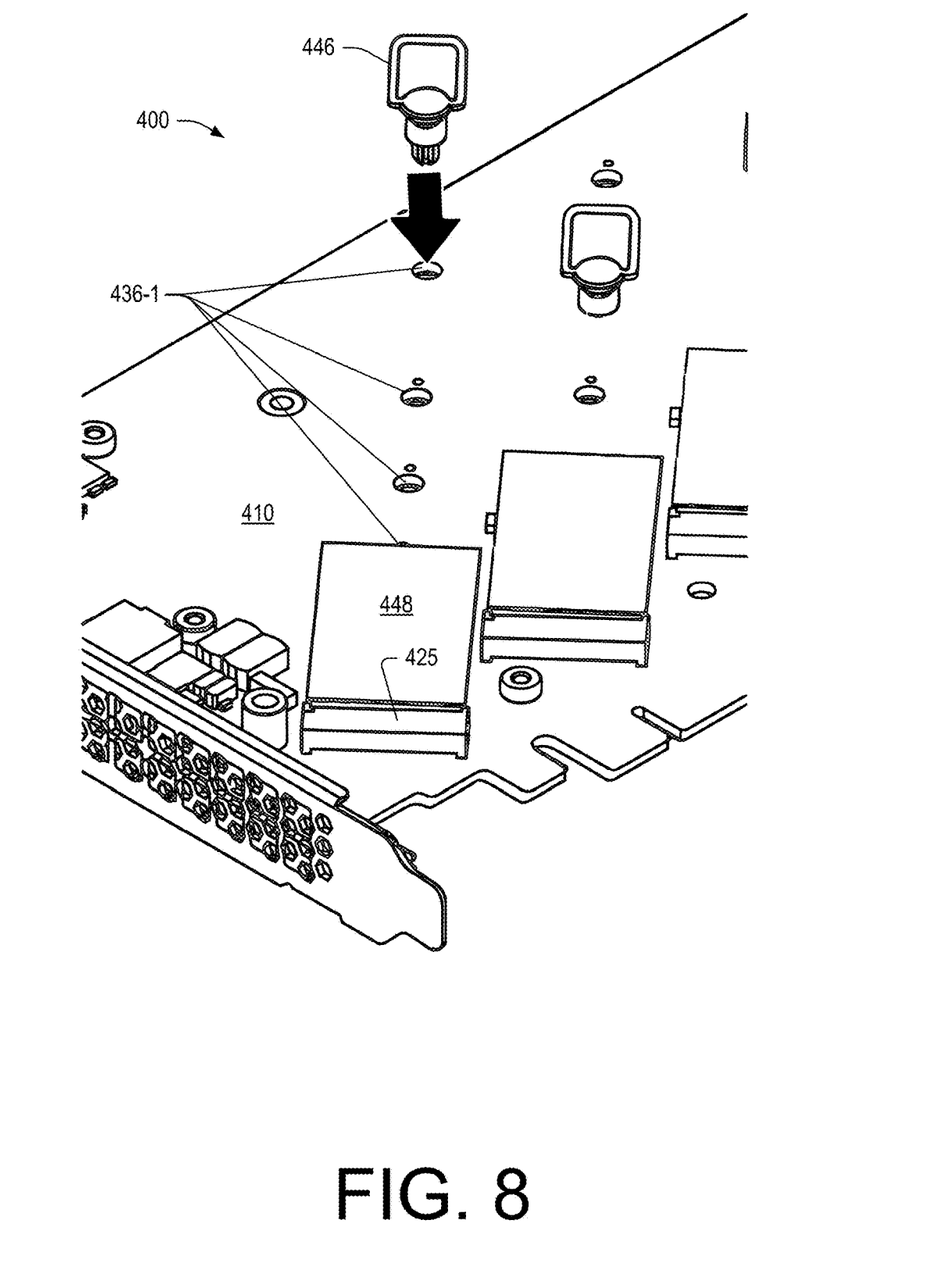
FIG. 8 is a diagram of an example of a method with respect to a card assembly.

FIG. 8 shows an arrow that indicates a direction of movement for the mounting component 446, for example, as part of a process for readying the card assembly 400 for receipt of a device that is longer than the device 300 as shown in FIG. 7. In FIG. 8, heat transfer material 448 can be seen as being in contact with the card 410. As mentioned, a socket can impede air flow. A socket and a heat transfer pad may be positioned proximate to each other such that a long device (e.g., 110 mm) includes a portion that has clearances on opposing sides that allow for air flow and, thereby, convective heat transfer (e.g., via air driven by a fan).

Figure 9:
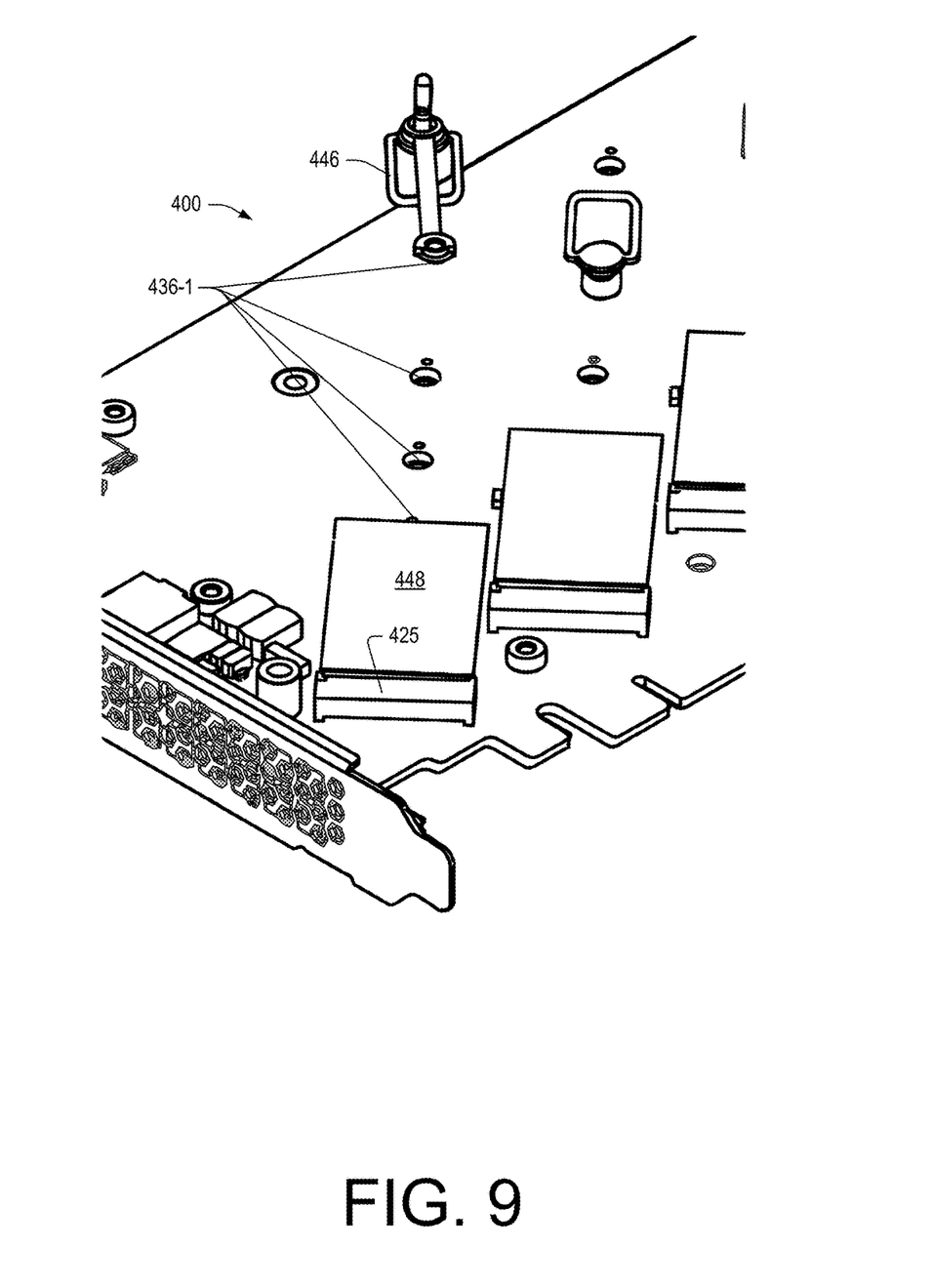
FIG. 9 is a diagram of an example of a method with respect to a card assembly.

FIG. 9 shows the mounting component 446 in a receiving state, for example, as part of a process for readying the card assembly 400 for receipt of a device that is longer than the device 300 as shown in FIG. 7. In FIG. 9, the mounting component 446 can be manipulated between the receiving state (e.g., an unlocked state) and a locked state where in the locked state, the mounting component 446 can position a device a distance from the card 410 (e.g., from the side 422 of the card 410, which can allow for air flow in a clearance therebetween).

Figure 10:
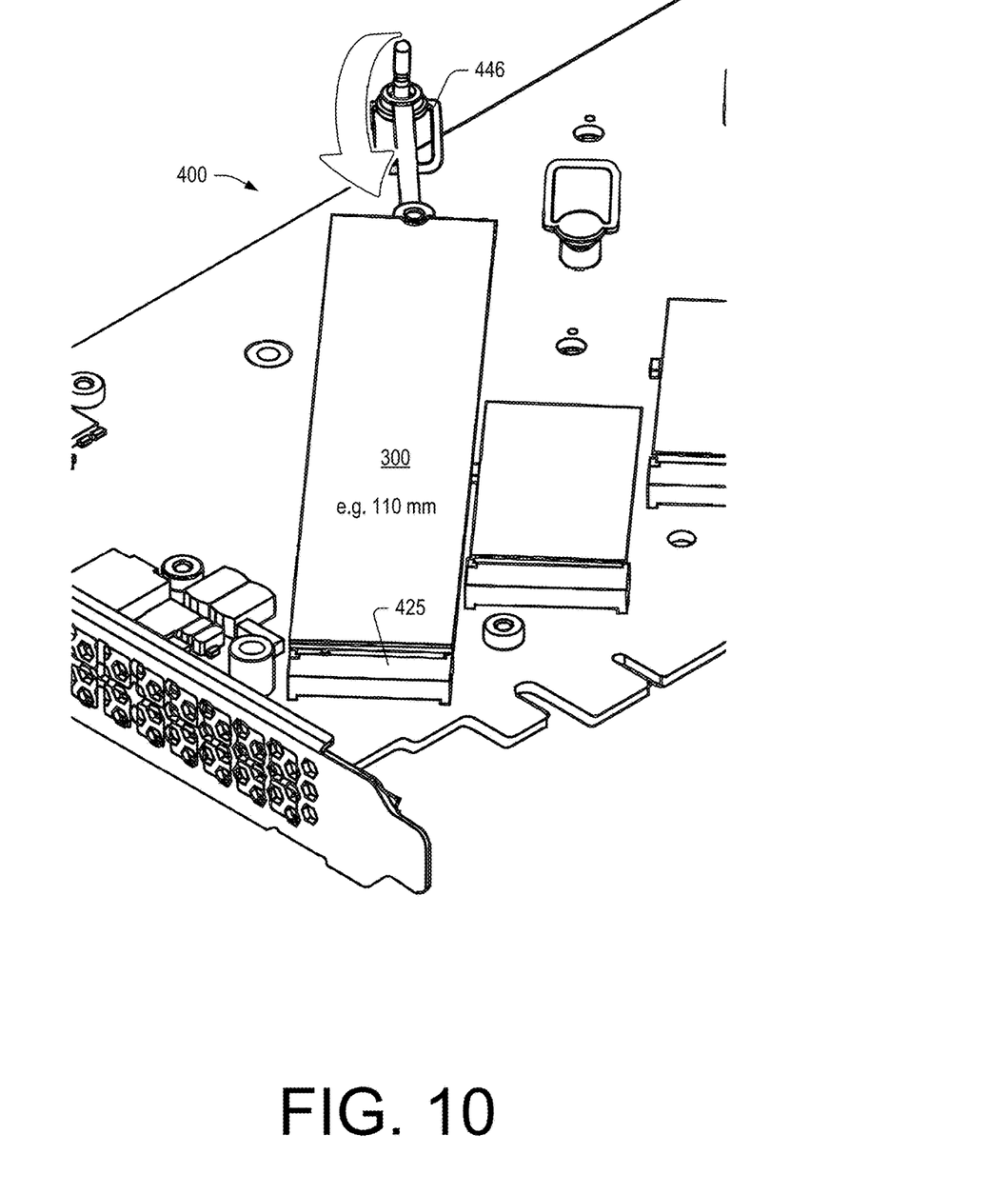
FIG. 10 is a diagram of an example of a method with respect to a card assembly.

FIG. 10 shows the mounting component 446 being transitioned from the receiving state to the locked state to secure the device 300 in the device bay. In the example of FIG. 10, the card assembly 400 with the device 300 secured in the device bay at least in part by the socket 425 and, for example, at least in part via the mounting component 446, the card assembly 400 may be positioned in a card slot of a computing system. For example, one of the PCIe slots 126 of the computing system 100 of FIG. 1 may be utilized. In such an example, the computing system 100 may be operational and utilized to transfer information to and/or from the device 300 via the slot 126 and an edge connector of the card assembly 400 and the socket 425 of the card assembly 400 and an edge connector of the device 300. In such an example, the information may be transferred via traces where such traces may be without interruption by a repeater (e.g., a redriver and/or a retimer).

As an example, a chipset can be operatively coupled to a board such as, for example, a motherboard. As an example, a board such as, for example, a motherboard, can include one or more edge connectors (e.g., female slots that can receive a male edge). In such an example, the one or more edge connectors can include one or more PCIe edge connectors.

As an example, a card assembly can include a card that includes a first edge and an opposing second edge, where the first edge includes an edge connector; and device sockets mounted to the card and operatively coupled to the edge connector, where each of the device sockets defines an end of a respective device bay and where each of the device bays is disposed at an angle of approximately 25 degrees to approximately 75 degrees with respect to the edge connector. In such an example, the edge connector can be operatively coupled to the device sockets via electrical connections, for example, consider traces (e.g., printed circuit board traces, etc.). As an example, operatively coupled can be or include electrically coupled.

As an example, a card assembly can include a device disposed in one of its device bays where the device is operatively coupled to an edge connector of the card assembly via a corresponding one of a plurality of device sockets. In such an example, an air flow clearance can exist between the device and a surface of the card.

As an example, a card assembly can include a card and devices disposed in device bays where each of the devices is operatively coupled to an edge connector of the card via a corresponding one of the device sockets. In such an example, an air flow clearance can exist between each of the devices and a surface of the card. In such an example, the card can include opposing ends and where a line-of-sight exists in the air flow clearances along a direction between the opposing ends. In such an example, the line-of-sight can be from an outlet of a fan and one or more openings such as one or more bracket openings (see, e.g., the openings 442 of the bracket 440).

As an example, at least one of a plurality of device sockets of a card assembly can be located closer to a first edge than a second edge where the first edge includes an edge connector. In such an example, the at least one of the device sockets can be operatively coupled to the edge connector without a repeater.

As an example, a card assembly can include a card where a dimension of the card, between a first edge along an edge connector and a second edge, is equal to or less than a maximum dimension of one of a plurality of device bays of the card assembly.

As an example, an edge connector can be or include a PCIe edge connector (e.g., a PCIe specification edge connector).

As an example, a card assembly can include sockets that are or include one or more M.2 specification sockets.

As an example, a card assembly can include a fan driven by an electric motor.

As an example, a card assembly can include a card and device bays where each of the device bays is disposed at an angle of approximately 30 degrees to approximately 60 degrees with respect to an edge connector of an edge of the card. As an example, each of such device bays can be disposed at an angle of approximately 35 degrees to approximately 55 degrees with respect to the edge connector.

As an example, a card assembly can include a card that includes a first edge and an opposing second edge, where the first edge includes a PCIe specification edge connector; and M.2 specification device sockets mounted to the card and operatively coupled to the PCIe specification edge connector, where each of the device sockets defines an end of a respective device bay, and where each of the device bays is disposed at an angle of approximately 35 degrees to approximately 55 degrees with respect to the PCIe specification edge connector; and solid-state storage devices disposed in the device bays and operatively coupled to the PCIe specification edge connector via the M.2 specification device sockets. In such an example, the card can include traces that operatively couple the PCIe specification edge connector and the M.2 specification device sockets. In such an example, the traces can be traces uninterrupted by one or more repeaters.

As an example, a computing system can include a processor; memory accessibly by the processor; a slot; a card that includes a first edge and an opposing second edge, where the first edge includes an edge connector disposed at least in part in the slot; and device sockets mounted to the card and operatively coupled to the processor via the slot and the edge connector, where each of the device sockets defines an end of a respective device bay, where each of the device bays is disposed at an angle of approximately 25 degrees to approximately 75 degrees with respect to the edge connector. In such an example, the computing system can include devices disposed in the device bays where each of the devices is operatively coupled to the processor via the slot via and the edge connector. As an example, at least the processor and the slot can be operatively coupled to a motherboard of the computing system.

Various coordinate systems are shown in the drawings. Dimensions, shapes, sizes, ratios, orientations, etc., may be defined with respect to one or more dimensions of one or more coordinate systems.

As described herein, various acts, steps, etc., may be implemented as instructions stored in one or more computer-readable storage media where a computer-readable storage medium is not a signal. For example, one or more computer-readable storage media can include computer-executable (e.g., processor-executable) instructions to instruct a device. A computer-readable medium may be a computer-readable medium that is not a carrier wave.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions. Such circuitry may optionally rely on one or more computer-readable media that includes computer-executable instructions. As described herein, a computer-readable medium may be a storage device (e.g., a memory chip, a memory card, a storage disk, etc.) and referred to as a computer-readable storage medium.

Figure 11:
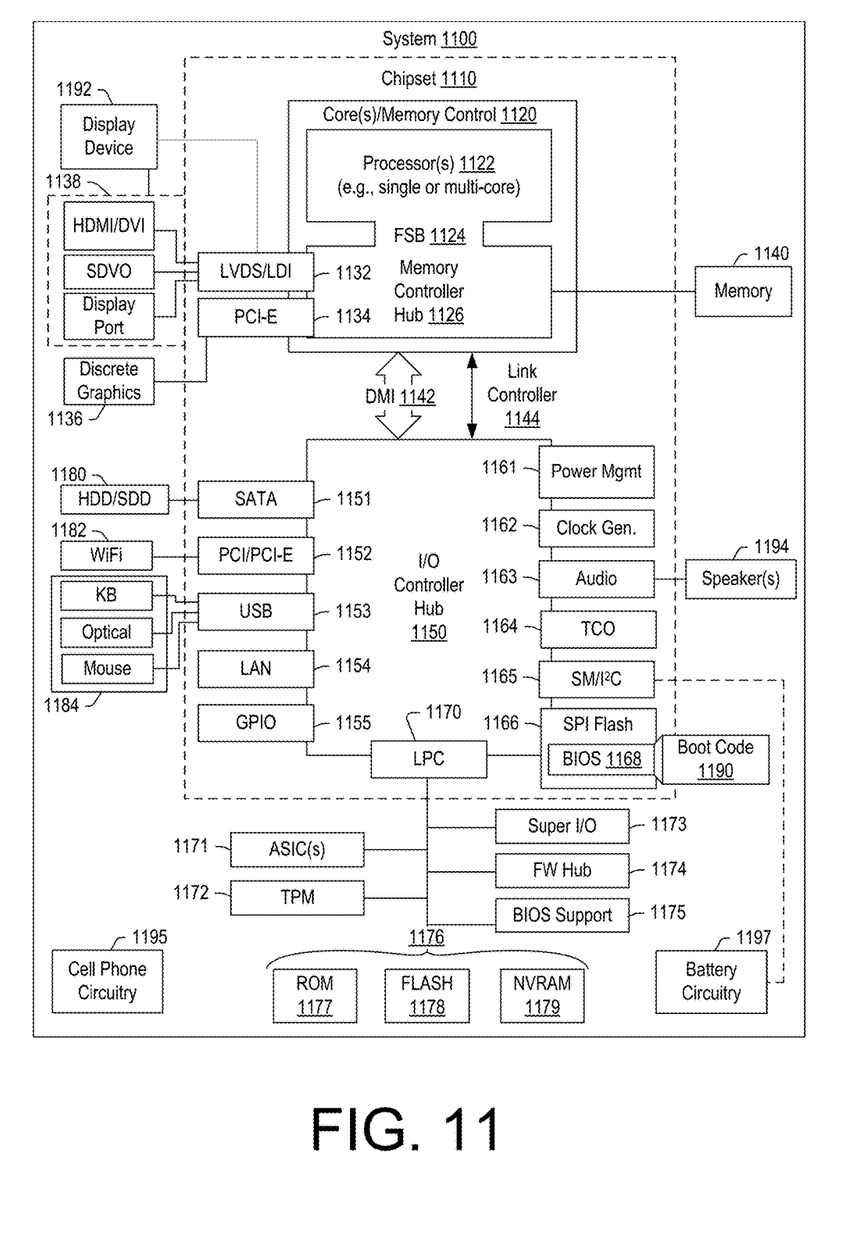
FIG. 11 is a diagram of an example of a system.

While various examples of circuits or circuitry have been discussed, FIG. 11 depicts a block diagram of an illustrative computer system 1100. The system 1100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a satellite, a base, a server or other machine may include other features or only some of the features of the system 1100. As an example, a computing system as shown in the examples of FIGS. 1 and 2 may include at least some of the features of the system 1100.

As shown in FIG. 11, the system 1100 includes a so-called chipset 1110. A chipset refers to a group of integrated circuits, or chips, that are designed (e.g., configured) to work together. Chipsets are usually marketed as a single product (e.g., consider chipsets marketed under the brands INTEL®, AMD®, etc.).

In the example of FIG. 11, the chipset 1110 has a particular architecture, which may vary to some extent depending on brand or manufacturer. The architecture of the chipset 1110 includes a core and memory control group 1120 and an I/O controller hub 1150 that exchange information (e.g., data, signals, commands, etc.) via, for example, a direct management interface or direct media interface (DMI) 1142 or a link controller 1144. In the example of FIG. 11, the DMI 1142 is a chip-to-chip interface (sometimes referred to as being a link between a "northbridge" and a "southbridge").

The core and memory control group 1120 include one or more processors 1122 (e.g., single core or multi-core) and a memory controller hub 1126 that exchange information via a front side bus (FSB) 1124. As described herein, various components of the core and memory control group 1120 may be integrated onto a single processor die, for example, to make a chip that supplants the conventional "northbridge" style architecture.

The memory controller hub 1126 interfaces with memory 1140. For example, the memory controller hub 1126 may provide support for DDR SDRAM memory (e.g., DDR, DDR2, DDR3, etc.). In general, the memory 1140 is a type of random-access memory (RAM). It is often referred to as "system memory". As an example, a system can include multiple memory controllers.

The memory controller hub 1126 further includes a low-voltage differential signaling interface (LVDS) 1132. The LVDS 1132 may be a so-called LVDS Display Interface (LDI) for support of a display device 1192 (e.g., a CRT, a flat panel, a projector, etc.). A block 1138 includes some examples of technologies that may be supported via the LVDS interface 1132 (e.g., serial digital video, HDMI/DVI, display port). The memory controller hub 1126 also includes one or more PCI-express interfaces (PCIe) 1134, for example, for support of discrete graphics 1136. Discrete graphics using a PCIe interface can be an alternative approach to an accelerated graphics port (AGP). For example, the memory controller hub 1126 may include a 16-lane (×16) PCIe port for an external PCIe-based video card (e.g., video/graphics card). As an example, more than one video card may be utilized. A system may include AGP or PCIe for support of graphics. As an example, a display may be a sensor display (e.g., configured for receipt of input using a stylus, a finger, etc.). As an example, a sensor display may rely on resistive sensing, optical sensing, or other type of sensing. As an example, a system can utilize PCIe graphics. As an example, one or more graphics cards can include one or more graphics processors that can be operatively coupled to a motherboard via one or more PCIe edge connectors.

The I/O hub controller 1150 includes a variety of interfaces. The example of FIG. 11 includes a SATA interface 1151, one or more PCIe interfaces 1152 (optionally one or more legacy PCI interfaces), one or more USB interfaces 1153, a LAN interface 1154 (more generally a network interface), a general purpose I/O interface (GPIO) 1155, a low-pin count (LPC) (or eSPI) interface 1170, a power management interface 1161, a clock generator interface 1162, an audio interface 1163 (e.g., for speakers 1194), a total cost of operation (TCO) interface 1164, a system management bus interface (e.g., a multi-master serial computer bus interface) 1165, and a serial peripheral flash memory/controller interface (SPI Flash) 1166, which, in the example of FIG. 11, includes BIOS 1168 and boot code 1190. With respect to network connections, the I/O hub controller 1150 may include integrated gigabit Ethernet controller lines multiplexed with a PCIe interface port. Other network features may operate independent of a PCIe interface.

The interfaces of the I/O hub controller 1150 provide for communication with various devices, networks, etc. For example, the SATA interface 1151 provides for reading, writing or reading and writing information on one or more drives 1180 such as HDDs, SDDs or a combination thereof. The I/O hub controller 1150 may also include an advanced host controller interface (AHCI) to support one or more drives 1180. The PCIe interface 1152 allows for wireless connections 1182 to devices, networks, etc. The USB interface 1153 provides for input devices 1184 such as keyboards (KB), one or more optical sensors, mice and various other devices (e.g., microphones, cameras, phones, storage, media players, etc.). One or more other types of sensors may optionally rely on the USB interface 1153 or another interface (e.g., I²C, etc.). As to microphones, the system 1100 of FIG. 11 may include hardware (e.g., audio card) appropriately configured for receipt of sound (e.g., user voice, ambient sound, etc.).

In the example of FIG. 11, the LPC interface 1170 provides for use of one or more ASICs 1171, a trusted platform module (TPM) 1172, a super I/O 1173, a firmware hub 1174, BIOS support 1175 as well as various types of memory 1176 such as ROM 1177, Flash 1178, and non-volatile RAM (NVRAM) 1179. With respect to the TPM 1172, this module may be in the form of a chip that can be used to authenticate software and hardware devices. For example, a TPM may be capable of performing platform authentication and may be used to verify that a system seeking access is the expected system.

The system 1100, upon power on, may be configured to execute boot code 1190 for the BIOS 1168, as stored within the SPI Flash 1166, and thereafter processes data under the control of one or more operating systems and application software (e.g., stored in system memory 1140). An operating system may be stored in any of a variety of locations and accessed, for example, according to instructions of the BIOS 1168. Again, as described herein, a satellite, a base, a server or other machine may include fewer or more features than shown in the system 1100 of FIG. 11. Further, the system 1100 of FIG. 11 is shown as optionally include cell phone circuitry 1195, which may include GSM, CDMA, etc., types of circuitry configured for coordinated operation with one or more of the other features of the system 1100. Also shown in FIG. 11 is battery circuitry 1197, which may provide one or more battery, power, etc., associated features (e.g., optionally to instruct one or more other components of the system 1100). As an example, a SMBus may be operable via a LPC (see, e.g., the LPC interface 1170), via an I²C interface (see, e.g., the SM/I²C interface 1165), etc.

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A card assembly comprising:
    a card that comprises a first edge and an opposing second edge, wherein the first edge comprises an edge connector; and
    device sockets mounted to the card and operatively coupled to the edge connector, wherein each of the device sockets defines an end of a respective device bay, wherein each of the device bays is disposed at an angle of approximately 25 degrees to approximately 75 degrees with respect to the edge connector, and wherein a dimension of the card between the first edge along the edge connector and the second edge is equal to or less than a maximum dimension of one of the device bays.

2. The card assembly of claim 1 comprising a device disposed in one of the device bays that is operatively coupled to the edge connector via a corresponding one of the device sockets.

3. The card assembly of claim 2 wherein an air flow clearance exists between the device and a surface of the card.

4. The card assembly of claim 2 wherein the device disposed in the one of the device bays comprises a width dimension and a length dimension, wherein the length dimension is 42 mm, 60 mm, 80 mm or 110 mm, and wherein the device disposed in the one of the device bays is mounted to the card lengthwise between the one of the device sockets and a mounting component.

5. The card assembly of claim 1 comprising devices disposed in the device bays wherein each of the devices is operatively coupled to the edge connector via a corresponding one of the device sockets.

6. The card assembly of claim 5 wherein an air flow clearance exists between each of the devices and a surface of the card.

7. The card assembly of claim 6 wherein the card comprises opposing ends and wherein a line-of-sight exists in the air flow clearances along a direction between the opposing ends.

8. The card assembly of claim 1 wherein at least one of the device sockets is located closer to the first edge than the second edge.

9. The card assembly of claim 8 wherein the at least one of the device sockets is operatively coupled to the edge connector without a repeater.

10. The card assembly of claim 1 wherein the edge connector comprises a PCIe edge connector.

11. The card assembly of claim 1 wherein the device sockets comprise M.2 specification sockets.

12. The card assembly of claim 1 comprising a fan driven by an electric motor.

13. The card assembly of claim 1 wherein each of the device bays is disposed at an angle of approximately 30 degrees to approximately 60 degrees with respect to the edge connector.

14. The card assembly of claim 1 wherein each of the device bays is disposed at an angle of approximately 35 degrees to approximately 55 degrees with respect to the edge connector.

15. A card assembly comprising:
a card that comprises a first edge and an opposing second edge, wherein the first edge comprises a PCIe specification edge connector; and
M.2 specification device sockets mounted to the card and operatively coupled to the PCIe specification edge connector, wherein each of the device sockets defines an end of a respective device bay, wherein each of the device bays is disposed at an angle of approximately 35 degrees to approximately 55 degrees with respect to the PCIe specification edge connector; and
solid-state storage devices disposed in the device bays and operatively coupled to the PCIe specification edge connector via the M.2 specification device sockets.

16. The card assembly of claim 15 wherein traces operatively couple the PCIe specification edge connector and the M.2 specification device sockets.

17. The card assembly of claim 16 wherein the traces are uninterrupted by one or more repeaters.

18. A computing system comprising:
a processor;
memory accessibly by the processor;
a slot;
a card that comprises a first edge and an opposing second edge, wherein the first edge comprises an edge connector disposed at least in part in the slot; and
device sockets mounted to the card and operatively coupled to the processor via the slot and the edge connector, wherein each of the device sockets defines an end of a respective device bay, wherein each of the device bays is disposed at an angle of approximately 25 degrees to approximately 75 degrees with respect to the edge connector, and wherein a dimension of the card between the first edge along the edge connector and the second edge is equal to or less than a maximum dimension of one of the device bays.

19. The computing system of claim 18 comprising devices disposed in the device bays wherein each of the devices is operatively coupled to the processor via the slot via and the edge connector.

20. The computing system of claim 18 wherein at least the processor and the slot are operatively coupled to a motherboard of the computing system.

* * * * *